United States Patent [19]

Cilny

[11] 4,294,427
[45] Oct. 13, 1981

[54] MONO-SEAT GATE VALVE

[76] Inventor: Eugene J. Cilny, 13418 Lindsay, Cypress, Tex. 77429

[21] Appl. No.: 59,251

[22] Filed: Jul. 19, 1979

[51] Int. Cl.³ ............................................. F16K 25/00
[52] U.S. Cl. ...................................... 251/86; 251/158; 251/203; 251/194; 251/330
[58] Field of Search ................. 251/86, 158, 194, 330, 251/333

[56] References Cited

U.S. PATENT DOCUMENTS

| | | | |
|---|---|---|---|
| 373,522 | 11/1887 | Giles | 251/86 |
| 584,291 | 6/1897 | Osgood | 251/86 |
| 855,385 | 5/1907 | Churchill | 251/330 X |
| 1,280,451 | 10/1918 | Hagen | 251/158 |
| 1,972,748 | 9/1934 | Smith | 251/333 |
| 2,963,267 | 12/1960 | Bancroft | 251/333 |
| 2,973,008 | 2/1961 | Klose | 251/333 X |
| 3,397,862 | 8/1968 | Batzer | 251/158 X |

Primary Examiner—Harold W. Weakley
Attorney, Agent, or Firm—Michael D. McCully

[57] ABSTRACT

A single valve element disc and seat gate valve has an in-line flow passage therethrough. The valve seat plane is inclined approximately 5° from the valve stem. First and second cam surfaces are positioned outside the flow passage, and are inclined approximately 30° from the stem axis so that the cam surfaces and the valve seat plane define a wedge for receiving the valve disc and a hanger supporting the disc.

The valve seat is a frustoconical surface. The valve disc is fixed to the hanger by means for urging the valve disc against the seat at the center thereof in a manner to ensure an effective seal therebetween. The gate valve includes a back seal for permitting the stem seal to be removed and replaced while the valve remains in service.

3 Claims, 4 Drawing Figures

U.S. Patent     Oct. 13, 1981     4,294,427
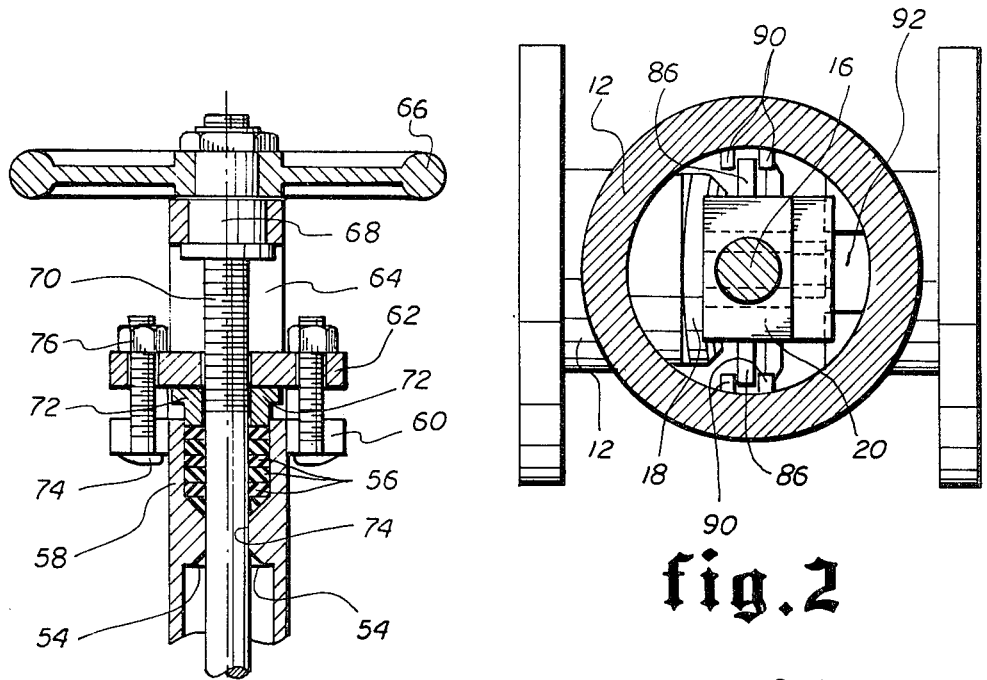
fig.2
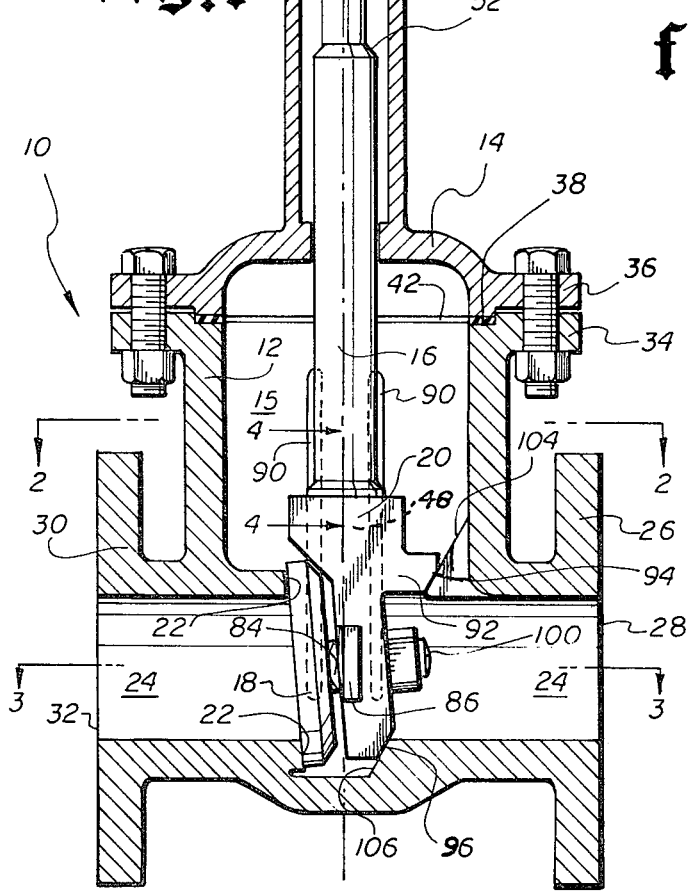
fig.1
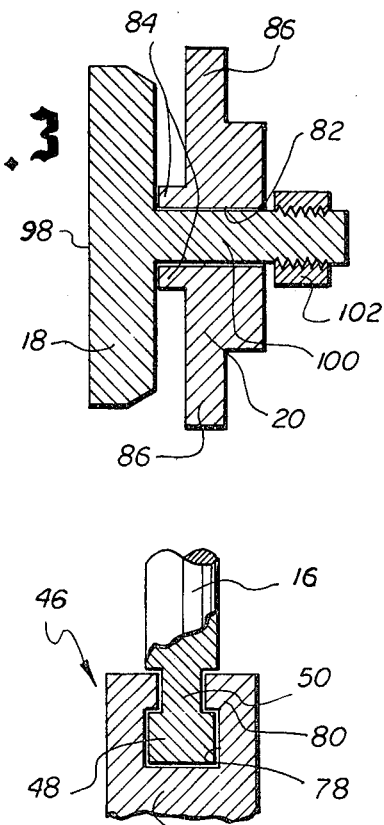
fig.3
fig.4

MONO-SEAT GATE VALVE

BACKGROUND OF THE INVENTION

This invention pertains to valves and especially to gate valves suitable for high-pressure cryogenic service. The invention is specifically directed to a gate valve having a single seat and disc that are urged into sealing engagement with one another by the action of the engagement of two sets of mating cam surfaces as the disc hanger or gate is lowered into position.

Gate valves have been used extensively for quite sometime, primarily in the petroleum industry as control valves for gas and oil pipelines. In addition, valves of various types have utilized a single disc and seat in various applications, typically water hydrants, as shown in U.S. Pat. Nos. 373,522, 224,061 and 653,600. These water hydrants typically utilize a single seat which travels vertically down a threaded shaft to engage a cam means to urge the valve disc against the valve seat. In this type of valve, the cam means is a single device positioned in the fluid medium flow passage and necessarily obstructs fluid flow therethrough. In addition, those prior art devices utilizing a universal joint means of attaching the valve element disc to the carriage or hanger are not of the in-line, flow through type. Consequently, they created turbulence within the valve due to obstructions within and the fluid flow being diverted therearound.

It is therefore an object of the present invention to provide gate valve having an in-line flow passage therethrough, having a single disc and seat that has limited universal movement with respect to its carrying body to aid in seating against the valve seat, and having a valve mechanism that is removed from the valve flow passage when in open position to reduce fluid flow turbulence within the valve.

SUMMARY OF THE INVENTION

A single valve element disc and seat gate valve is shown having an in-line flow passage therethrough. A sealing surface of the annular valve seat is inclined approximately 5° from the axis defined by the valve stem. First and second cam action surfaces form part of the valve body and are external to the fluid flow passage. Each of these surfaces is inclined approximatly 30° from the stem axis, opposite a plane defined by the valve seat, thus forming a wedge or "V" for receiving the valve element disc and a hanger, supporting the disc. The hanger includes mating inclined cam action surfaces that engage the body cam action surfaces to urge the valve disc sealing engagement with its valve seat.

The valve seat defines a sealing surface generated about an axis normal to the plane thereof. In the preferred embodiment, this a frusto conical sealing surface with a taper or incline of 0°—10° from the valve seat plane. The valve disc is affixed to the hanger by means permitting limited universal movement of the disc with respect to the hanger, so that as the valve disc contacts the valve seat it will automatically seek its proper sealing position. As the valve disc and hanger are lowered into position, the valve disc is urged into sealing engagement with the valve seat by the action of the mating inclined cam action surfaces of the valve body and hanger. This force against the backside of the valve disc is directed to points adjacent the geometric center of the disc, enabling the disc to seek its proper sealing position. The limited universal movement means transmits this force from the respective mating inclined cam action surfaces, located out of the flow passage, approximately equi-distant from the line of force applied to the valve disc, to urge the disc into sealing engagement with the valve seat.

The gate valve includes a back seal feature provided by a tapered surface on the stem thereof engaging a valve seating surface formed in the gate valve bonnet, for providing a seal around the stem when the gate valve is in full open position, permitting annular valve packing around the stem to be inspected, and/or replaced while the valve remains in service.

BRIEF DESCRIPTION OF THE DRAWINGS

For a detailed description of the preferred embodiment of the invention, reference is made to the accompanying drawings wherein:

FIG. 1 is a vertical sectional view of the gate valve of the present invention shown in the closed position.

FIG. 2 is a horizontal sectional view of the gate valve of the present invention taken along section lines 2—2;

FIG. 3 is a horizontal sectional view of the gate valve of the present invention taken along section lines 3—3; and FIG. 4 is a partial vertical view of the stem and hanger connection.

DESCRIPTION OF THE PREFERRED EMBODIMENT

Turning now to the drawings, and more specifically to FIG. 1, the gate valve of the present invention is shown generally illustrated by the numeral 10. The gate valve 10 comprises the following major components: a body 12, a bonnet 14, a stem 16 a valve element or disc 18 and a disc hanger 20.

As best shown in FIG. 1, the valve body 12 includes an internal cylindrical surface 24 defining an internal flow passage through the valve having a common axis. An annular valve seat 22 is positioned about the flow passage 24, the plane defined by the annular valve seat being approximately normal to this common axis, but inclined slightly therefrom approximately 0°–10°. In the preferred embodiment, a center axis of this annular valve seat 22 normal to the plane thereof is inclined from this common axis approximately 5°. The internal cylindrical surface 24 terminates at a first flange 26 defining the inlet 28 of the gate valve 10. Similarly, the internal cylindrical surface 24 terminates at the opposite end thereof at a second flange 30 defining the gate valve outlet 32.

The main body portion of the valve body 12 includes a cylindrical second section 13 terminating in a third flange 34 on which the bonnet 14 is bolted or otherwise affixed to define a valve chamber 15 for receiving the disc hanger 20 and valve disc 18 when in open position. The bonnet 14 cooperates with the body second section 13 to further define the valve chamber 15. The gate valve body second section 13 includes an annular groove 38 therein for receiving an annular gasket 42 for precluding the escape of medium fluid at the interface of the body third flange 34 and bonnet flange 36. The bonnet flange 36 includes an annular ridge 40 approximately the same size of, and adapted to mate with, the body annular groove 38 in order to compress and retain the annular gasket 42 in position when the bonnet 14 is attached to the body second section 13.

As shown in the drawings, the gate valve 10 includes a stem 16 extending through a stem bore 44 of the bonnet 14 up through the bonnet upper portion 58 and handle housing 64 for raising and lowering the valve disc with respect to its annular valve seat 22. The lower portion of stem 16 includes a "T" section 46 for supporting the disc hanger 20. As best shown in FIG. 4, the stem "T" section 46 includes a cross member 48 and central member 50 for engaging a mating passageway 78 of the hanger 20 an annular seal portion 52 for sealably engaging a mating stem seat 54 on the bonnet stem bore 44 when the stem is in its uppermost position, as will be explained hereinbelow.

The bonnet upper portion 58 includes a number of annular stem seal packing segments 56, forming a medium fluid seal between the valve stem 16 and bonnet 14 to preclude the escape of medium fluid therebetween. These packing segments 56 are generally for raising and lowering the hanger and valve disc 18 with respect to the valve annular seat 22 while permitting limited movement of the hanger with respect to the stem in a plane normal to the axis of the stem. The stem 16 also includes washer-shaped and adapted to be compressed to form a pressure tight seal around the valve stem 16. A packing ring 72 is retained in position to compress the seal packing material 56 by a handle housing flange 62 affixed to a bonnet upper flange 60 by appropriate bolts and nuts 74 and 76 or other suitable means permitting the compression on the packing material 56 to be readily adjusted.

A handle 66 is located in a vertically stationary position about the housing 64, so that rotating the handle causes an internally threaded section thereof 68 to engage mating threads 70 on the gate valve stem 16 to raise and lower the stem with respect to the body 12 and the bonnet 14 portions of the gate valve.

The gate valve 10 of the present invention includes a valve element or disc 18 having a machined circular front sealing surface 98 for sealing against the annular valve seat 22. The valve disc 18 includes a threaded shaft 100, the axis thereof coinciding with an axis passing through the geometric enter of the valve disc normal to the plane of the valve disc. The disc threaded shaft 100 is positioned within a center hole 82 of the valve hanger 20 and is loosely retained in place by a standard hex nut 102 affixed to the threaded shaft 100 in a manner to permit limited universal movement of the disc within the hanger so that the disc will automatically and uniformly seal about the valve seat 22 when the disc and hanger mechanism is lowered into sealing position. As best shown in FIG. 1, the hanger 20 includes two vertically oriented arcuate members 84 positioned on either side of the center hole 82 for projecting the disc 18 outwardly therefrom and permitting limited universal movement of the disc with respect to the hanger. The combination of the arcuate members 84, the freedom of movement of the disc shaft 100 within the hanger center hole 82 and the nut 102 being threaded onto the shaft leaving sufficient clearance between the nut and the hanger surface, permits the disc 18 to pivot about a horizontal axis through approximately 5° from center in each direction to enable the disc to automatically locate its natural seat and uniformly seal against the annular valve seat 22.

As best shown in FIG. 4, the hanger 20 includes a horizontal passageway 78 and a pair of inwardly projecting lips 80 for retaining the "T" section 46 of the valve stem. The interconnection of the "T" section 46 and the hanger 20 is sufficiently loose to permit reasonable freedom of movement between the two to permit the valve disc 18 to locate its natural seat about the annular valve seat 22.

The hanger 20 includes a pair of vertical guide tabs 86 extending therefrom, each adapted to travel within a body guide channel 88 defined by a pair of vertical body elongated projections 90 formed as part of the inner cylindrical surface of the valve body second section 13. These guide tabs 86 and guide channels 88 serve to retain the hanger 20 in alignment within the valve body 12 to prevent galling and binding of the disc 18 or hanger 20 as the mechanism is lowered in to position to seat the disc against the annular valve seal 22.

The hanger 20 includes an outwardly projecting leg 92 having a first downwardly facing inclined cam action surface 94 for engaging a mating body inclined cam action surface 104 to urge the valve disc 18 in sealing engagement with the annular seat 22. The hanger also includes a second downwardly facing inclined cam action surface 96, likewise for engaging a mating body inclined cam action surface 106 for the same purpose. As best shown in FIG. 1, the pair of respective body first and second cam action surfaces 104 and 106 are positioned outside of the medium fluid flow passage 24, thereby permitting unobstructed flow of the medium fluid through the flow passage and reducing turbulence therethrough.

The annular valve seat 2 of the present invention defines an annular sealing surface which is generated about an axis normal to the plane defined by the valve seat and is tapered or inclined 0°-10° from such plane. In the preferred embodiment of the present invention, this sealing surface is of a frusto conical shape, being generated about the normal axis, and having a taper on incline of approximately 5° with respect to the valve seat plane. In this manner, the sealing surface contributes to prevent the disc 18 from binding thereagainst as the disc and hanger 20 are lowered into sealing engagement with the valve body 12, in addition to providing improved sealing capability between the disc and annular valve seat 22.

The gate valve of the present invention incorporates an outside screw and yoke feature to raise and lower the valve stem 16 to open and close the valve. In this type of system, the stem does not rotate, but rather rotating the handle causes the stem to be raised or lowered. As shown in FIG. 1, the threaded portion of the stem is external to the valve. In this manner, the threads are not exposed to the fluid medium carried by the valve, and thus are not subject to rust, corrosion, galling or other problems inherent in gate valves of type having non-rising valve stems. Additionally, the valve stem threads of the present gate valve, being external, may be periodically inspected and lubricated if necessary with the valve in service, when the valve is in either closed or full open position.

In operation, the gate valve 10 is installed in a flow line or a pipeline in the conventional manner, with the upstream, or high pressure line connected to the first flange 26 so that the high pressure enters the inlet 28, and the flow is from right to left as shown in FIG. 1.

With the valve 10 in full open position, the valve hanger 20 and valve disc 18 are completely out of the line of flow, thereby reducing fluid turbulence in the flow passage which would otherwise be present in the "Chapman type" valve type or similar valve having a valve member that does not move completely out of the flow passage area when the valve is open.

The gate valve 10 of the present invention includes a back seal comprising an annular seal portion 52 formed as part of the stem 16, and a bonnet stem seat 54. When the valve 10 is in full open position, this annular seal 52 engages the bonnet stem seat 54 forming a seal therebetween to preclude the escape of any medium fluid. With the valve 10 in full open position, the annular stem seal packing 56 may be removed, inspected and/or replaced with the valve in service, at a substantial saving over those types of valves that must be removed from the flow line and/or returned to the shop for periodic maintenance and stem seal replacement.

To close the gate valve 10, turning the handle 66 will lower the stem 16, which in turn lowers the hanger 20 into engagement with the valve body 12, causing the valve disc 18 to engage the annular valve seat 22. As best shown in FIG. 1, the plane of the annular valve seat 22 is displaced from the stem axis at a first angle, approximately 0°–10°, and preferably 5°. In addition, each body inclined cam action surface 104 and 106 is inclined at a second angle, from 15°–45°, preferably 30° from the stem axis in a direction opposite from the valve seat plane, thereby forming a wedge or "V" into which the hanger 20 and valve disc 18 are lowered. This is so designated to minimize shear between the valve disc 18 and the annular valve seat 22 as the two engage one another.

In the preferred embodiment, the valve disc 18 has limited universal movement with respect to the hangar 20, so that the disc is permitted to rotate slightly with respect to the hanger each time the disc seats and unseats about the annular valve seat 22. This limited universal movement also permits the disc 18 to pivot about a horizontal axis approximately 5° from center, enabling the disc to seek its natural seat and uniformly seal about the annular valve seat 22 as the valve disc and hanger 20 are lowered into sealing engagement with the valve body.

As can be seen in FIG. 1, as the disc 18 and disc hanger 20 are lowered into closing position, the hanger respective first and second inclined cam action surfaces 94 and 96 simultaneously engage mating body first and second respective cam action surfaces 104 and 106 to urge the hanger and valve disc to the left into sealing engagement with the annular valve seat 22. The valve body respective first and second cam action surfaces 104 and 106 are inclined from vertical (as are mating respective first and second inclined surfaces 94 and 96 of the hanger) at said second angle, approximately 30° in the preferred embodiment, in order to redirect the force transmitted along the vertical axis of the stem 16 to a direction essentially normal to the plane of the annular valve seat 22. This 30° incline acts as a gear mechanism to multiply the force exerted along the valve stem 16 to apply an increased force to urge the valve disc 18 against the annular valve seat 22, forming an improved seal therebetween. It can be appreciated that the force exerted on the hanger 20 by respective body first and second cam action surfaces 104 and 106 is transmitted to the disc 18 at the center thereof approximately midway between the point of contact between the disc 20 and the valve body 12. In this manner, the force urging the disc 18 in sealing engagement with the annular valve seat 22 acts along the geometric center of the valve disc (along the center aixs of the disc threaded shaft 100) to provide a uniform sealing force thereto.

It can also be appreciated that when all mating surfaces (the first and second respective hanger cam surfaces and mating body first and second respective cam surfaces, and the valve disc and annular valve seat) engage, transverse (shear) travel of the disc with respect to the annular valve seat is minimized, thereby reducing excessive friction, wear and galling on these mating sealing surfaces.

With the valve disc 18 seated against the valve seat 22, as in FIG. 1, high pressure within the valve acts against the backside of the disc 18, in that portion of the flow passage 24 to the right of the disc, and in that portion of the valve formed by the valve body second section 13 and bonnet 14. This high pressure is maintained by the action of the valve disc 18 against the circular seat 22, the bonnet gasket 28 and the annular seal packing 56. It should be noted that with the high pressure on the backside of the valve disc 18, this high pressure serves as an aid seating the disc against the valve seat 22. In this manner, high pressure operates in favor of effecting a tight seal between the disc 18 and seat 22, as opposed to operating against an effective seal, were the high pressure to be on the opposite side of the disc.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve comprising:
  (a) a valve body formed to define inlet and outlet passages having a common axis, said valve body further defining a transverse axis being substantially normal to said common axis, said valve body defining an annular seat about at least one of said inlet and outlet passages, said seat lying in a plane that is inclined at a first angle with respect to said transverse axis, said seat being formed to define a frusto conical annular sealing surface, said sealing surface being generated about an axis disposed in normal relation to said inclined plane, said body defining first and second cam action surfaces inclined at a second angle with respect to said transverse axis in a direction opposite that of the plane of said valve seat, said cam action surfaces being positioned outside of the flow passage defined by said inlet and outlet passages and respectively above and below said flow passage, and a second body section defining a valve chamber communicating with said inlet and outlet passages;
  (b) a bonnet cooperating with said second body section to further define said valve chamber;
  (c) a closure member, comprising;
    (1) a hanger forming a front surface defining a plane, said plane inclined at said first angle with respect to a central axis of said hanger, and having a mounting hole therethough normal to said front surface plane, and having a vertically oriented arcuate member positioned on each side of said mounting hole adjacent thereto, said hanger further defining first and second cam action surfaces for engaging respective body first and second cam action surfaces, each of said hanger cam action surfaces inclined at said second angle with respect to said central axis;

(2) a valve disc defining a plane and having a mounting shaft formed at the geometric center thereof normal to said valve disc plane, said valve disc being carried and retained solely by said hanger in a spaced relation to said valve body in a manner to permit limited universal movement of said disc with respect to said hanger about an axis passing through said mounting hole normal to said hanger front surface plane, and positioned so that said disc plane is essentially parallel to said valve seat plane, said valve disc permitted to pivot about said mounting hole axis sufficiently to engage said valve seat and effect a uniform seal therebetween to preclude fluid flow through said passage; and (3) a valve stem having an axis coincident with said valve body transverse axis, said stem extending through said bonnet and valve chamber and carrying said hanger by a means permitting limited movement of said hanger with respect to said stem in a plane normal to said stem axis, said stem threadedly engaging said bonnet for raising and lowering said hanger and said valve disc with respect to said body flow passage;

(d) an annular seal positioned within said bonnet and about said stem for precluding the escape of medium fluid therebetween; and (e) a back seal formed by said stem and said bonnet when said stem is in its uppermost position for sealing said valve chamber to permit said annular seal to be removed and replaced while said valve remains in service, whereby lowering said stem and said hanger causes said hanger respective first and second cam action surfaces to engage respective first and second valve body cam action surfaces, thereby causing an axial force along said valve stem to be transmitted through said vertically oriented arcuate members to the geometric center of said valve disc in a direction essentially normal to said valve seat plane for urging said valve disc into sealing engagement with said valve seat to preclude fluid flow through said body flow passage.

2. The gate valve as set forth in claim 1, wherein said second angle is greater than said first angle.

3. The gate valve as set forth in claim 2, wherein said first angle is within the range of 0°–10° and wherein said second angle is within the range of 15°–45°.

* * * * *